United States Patent [19]
Akesaka

[11] Patent Number: 4,971,693
[45] Date of Patent: Nov. 20, 1990

[54] MUDDY WATER PROCESSING APPARATUS

[75] Inventor: Troshio Akesaka, Yokohama, Japan

[73] Assignee: 501 Kabushiki Kaisha Iseki Kaihatsu Koki, Tokyo, Japan

[21] Appl. No.: 404,953

[22] Filed: Sep. 7, 1989

[51] Int. Cl.⁵ .............................................. B07D 21/24
[52] U.S. Cl. .................... 210/297; 210/298; 210/386; 210/521; 210/524; 210/526; 100/118
[58] Field of Search ............... 210/521, 524, 526, 386, 210/400, 401, 297, 298, 261, 262; 100/118

[56] References Cited

U.S. PATENT DOCUMENTS

| | | | |
|---|---|---|---|
| 3,087,620 | 4/1963 | Hirs | 210/401 |
| 4,158,627 | 6/1979 | Ingemarsson | 210/386 |
| 4,192,747 | 3/1980 | Wykoff | 210/526 |
| 4,421,645 | 12/1983 | Creps et al. | 210/400 |
| 4,774,010 | 9/1988 | Bratten | 210/526 |

FOREIGN PATENT DOCUMENTS

| | | |
|---|---|---|
| 214136 | 5/1905 | Fed. Rep. of Germany . |
| 277725 | 8/1913 | Fed. Rep. of Germany . |
| 261982 | 9/1949 | Switzerland . |
| 415447 | 8/1934 | United Kingdom . |
| 2051598 | 1/1981 | United Kingdom . |

Primary Examiner—Peter Hruskoci
Assistant Examiner—Christopher Upton
Attorney, Agent, or Firm—Stoel, Rives, Boley, Jones & Grey

[57] ABSTRACT

An apparatus for processing muddy water containing particulate matter comprising a tank for receiving the particulate matter, and takeout means for receiving the particulate matter settling down in the tank and then conveying the received particulate matter to the upper portion of the tank, wherein the takeout means includes a belt conveyor provided with a first conveyance section disposed on the bottom of the tank and receiving the particluate matter to convey the received particulate matter to a predetermined portion in the tank and a second conveyance section for conveying the particulate matter conveyed by the first conveyance section upward in the tank while sandwiching the particulate matter between a pair of endless belts. The particulate matter contained in the muddy water supplied into the tank is deposited on the first conveyance section and then conveyed to a predetermined portion of the tank by the first conveyance section to thereafter be conveyed to the upper portion of the tank by the second conveyance section.

9 Claims, 6 Drawing Sheets

MUDDY WATER PROCESSING APPARATUS

BACKGROUND OF THE INVENTION

1. Field of the Invention:

This invention relates to a muddy water processing apparatus for settling down the particulate matter contained in muddy water and then removing the settled particulate matter and, more particularly, to a processing apparatus suitably used for the processing of muddy water produced by the execution of a tunnelling operation, a boring operation, a pile driving operation and an operation of removing sedimentary earth accumulated at the base of or in the vicinity of a dam or the like.

2. Description of the Prior Art:

A conventional processing method for removing particulate matter such as sand from muddy water comprises the steps of guiding the muddy water containing the particulate matter to a sedimentation tank, settling down the particulate matter in the sedimentation tank, and then scooping out the particulate matter that has settled on the bottom of the sedimentation tank by the use of a backhoe and a clamshell or the like.

However, according to this conventional method, a large quantity of water is scooped out together with the particulate matter. Thus, it is necessary to separate the scooped particulate matter and water from each other by a solid-liquid separator.

SUMMARY OF THE INVENTION

It is an object of the present invention to provide a muddy water processing apparatus, in which water drained out of a tank together with particulate matter is small in quantity.

An apparatus for processing muddy water containing particulate matter according to the present invention comprises a tank for receiving the muddy water; takeout means for receiving the particulate matter settling down in the tank and then conveying the settled particulate matter to the outside of the tank, wherein the takeout means includes a belt conveyor provided with a first conveyance section disposed on the bottom of the tank, for receiving the particulate matter to convey the received particulate matter to a predetermined portion in the tank; and a second conveyance section for conveying the particulate matter conveyed by the first conveyance section upwardly in the tank while sandwiching the particulate matter between a pair of endless belts.

The particulate matter contained in the muddy water supplied into the tank is deposited on the first conveyance section, then conveyed to a predetermined portion in the tank by the first conveyance section and thereafter conveyed to an upper portion of the tank by the second conveyance section.

According to the present invention, since the second conveyance section conveys the particulate matter while sandwiching the particulate matter between a pair of endless belts, water drained out together with the particulate matter is smaller in quantity than that in the case where the particulate matter is scooped out from the tank by a backhoe and a clamshell or the like, so that it is not necessary to separate the discharged particulate matter and water from each other by a solidliquid separator.

The belt conveyor used in the present invention, use can be made of a conveyor defining an L-shaped conveyance route consisting of a first endless belt having a first portion extending from one end to the other end of the tank along the bottom thereof so as to define the first conveyance section and a second portion extending upward from the bottom at the other end of the tank. A second endless belt having a portion extending upward from the bottom at the other end of the tank defines the second conveyance section when acting in cooperation with the second portion of the first endless belt.

In this case, the first endless belt may be disposed to circulate through a first pulley disposed at one end of the bottom so as to extend along the bottom of the tank, a second pulley disposed at the other end of the bottom so as to extend in parallel with the first pulley, a third pulley disposed above the tank so as to extend in parallel with the second pulley and a fourth pulley disposed so as to extend in parallel with the second pulley in a position slightly above the second pulley. Further, the second endless belt may be disposed to circulate through the fourth pulley and a fifth pulley disposed above the tank so as to extend in parallel with the third pulley.

The particulate matter conveyed to the upper portion of the tank by the takeout means can be conveyed to the outside of the tank by the conveyance means. Therefore, the conveyance means preferably employs a belt conveyor for receiving the particulate matter conveyed to the upper portion of the tank by the takeout means and then conveying the particulate matter along the conveyance surface extending obliquely upward. When the belt conveyor as noted above is used, the particulate matter is conveyed obliquely upward by the belt conveyor, while water contained in the particulate matter flows downward along the conveyance surface, so that water drained out together with the particulate matter becomes smaller in quantity.

The lower end of the conveyance surface may have a filter protruding therefrom, which prevents the passage of particulate matter received on the conveyance surface of the conveyance means but permits the passage of water. In this manner, the particulate matter to be conveyed may be prevented from reversely flowing into the tank together with water flowing downward along the conveyance surface.

The filter, can be of a louver-like design including a pair of first plate members confronting each other to extend in the vertical direction, and a plurality of second plate members disposed between the first plate members at intervals in the vertical direction and inclined so that one end of each second plate member in the width direction is located above the other end thereof. In this case, the filter is disposed so that one end of the filter is located on the rear side in the conveying direction of the particulate matter, while the other end is located on the front side.

If the tank is provided with an inlet port for the muddy water and an outlet port for the muddy water in the tank, the muddy water can be processed continuously.

In the muddy water processing apparatus of the present invention, it is preferable to dispose a plurality of plate-like guides for guiding the particulate matter contained in the muddy water to the first conveyance section and means for defining a muddy water flow path in the tank so as to move the muddy water flowing from an inlet port into the tank downward from the upper portion and then move the muddy water upward from the lower portion.

BRIEF DESCRIPTION OF THE DRAWING

The foregoing and other objects and features of the invention will become apparent from the following description of preferred embodiments of the invention with reference to the accompanying drawings, in which.

DETAILED DESCRIPTION OF PREFERRED EMBODIMENTS

As shown in FIGS. 1 through 4, a muddy water processing apparatus 10 comprises an upwardly opening rectangular parallelepiped-like sedimentation tank 12. The sedimentation tank 12 is provided with an inlet port 14 for the muddy water and an outlet port 16 for the muddy water in the tank 12. In the illustrated embodiment, the inlet port 14 is defined by a pipe for supplying muddy water from above to one end portion of the sedimentation tank 12 in the longitudinal direction. In contradistinction, the outlet port 16 is defined by a hole bored in one side wall of the sedimentation tank in the width direction and a chute extending from the hole.

Figure 1:
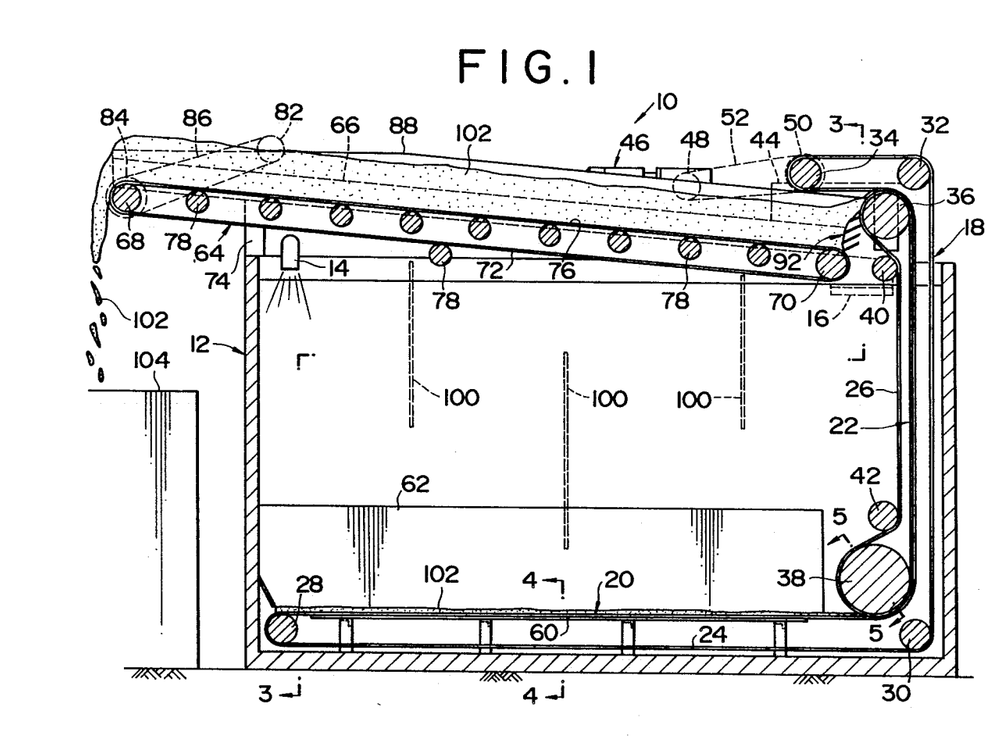
FIG. 1 is a longitudinal sectional view showing an embodiment of a processing apparatus according to the present invention.

The processing apparatus 10 further comprises a takeout mechanism 18 provided in the sedimentation tank 12 for conveying the particulate matter to the portion above the tank. The takeout mechanism 18 includes a belt conveyor provided with a pair of endless belts 24, 26 defining a first conveyance section 20 for receiving the particulate matter settling down in the sedimentation tank 12 and then conveying the settled particulate matter along the bottom of the sedimentation tank 12 to a predetermined portion and a second conveyance section 22 for further conveying upward the particulate matter conveyed by the first conveyance section 20 from the bottom of the sedimentation tank 12.

In order to define the first and second conveyance sections 20, 22, the endless belt 24 is disposed so as to circulate through a pulley 28 disposed at one end of the bottom so as to extend along the bottom in the width direction of the sedimentation tank 12, a pulley 30 disposed at the other end of the bottom so as to extend in parallel with the pulley 28, pulleys 32, 34, 36 disposed above the sedimentation tank 12 so as to extend in parallel with the pulley 30, and a pulley 38 disposed so as to extend in parallel with the pulley 30 in a position slightly oblique above the pulley 30.

On the other hand, in order to define the second conveyance section 22 together with the endless belt 24, the endless belt 26 is disposed so as to circulate through the pulleys 36, 38 and pulleys 40, 42 disposed between the pulleys 36, 38 at an interval in the vertical direction. Respective portions of the endless belts 24, 26 between the pulleys 36, 38 are overlapped each other so as to convey the particulate matter while sandwiching the particulate matter between the overlapped belt portions.

Figure 2:
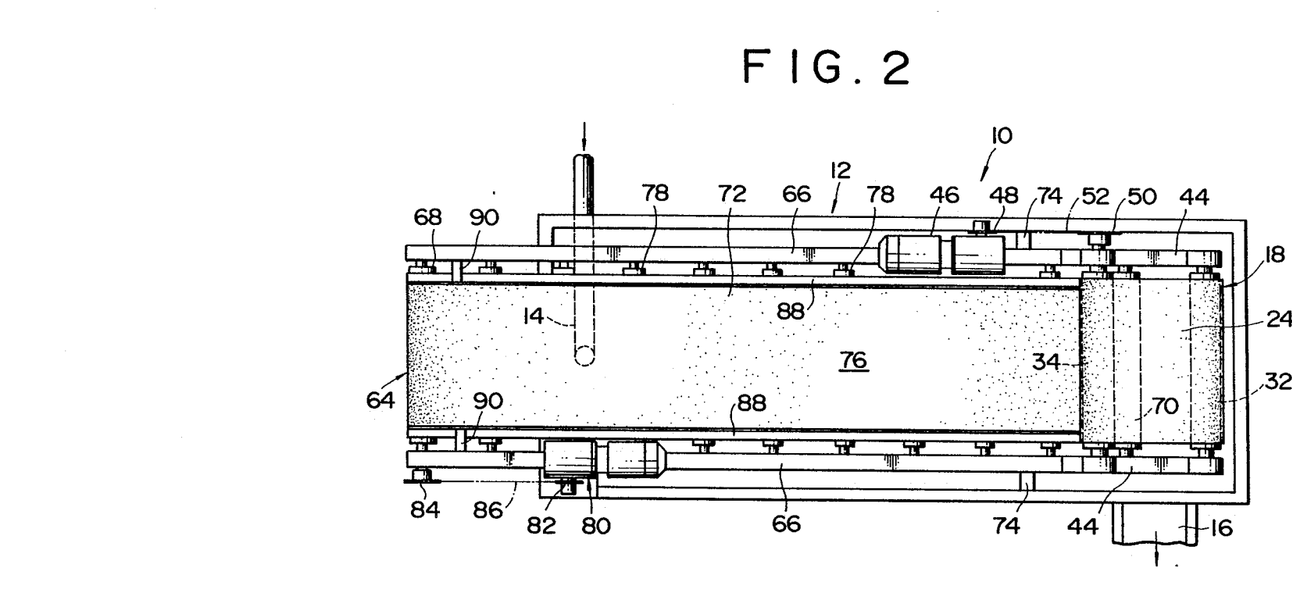
FIG. 2 is a plan view showing the processing apparatus of FIG. 1.
Figure 3:
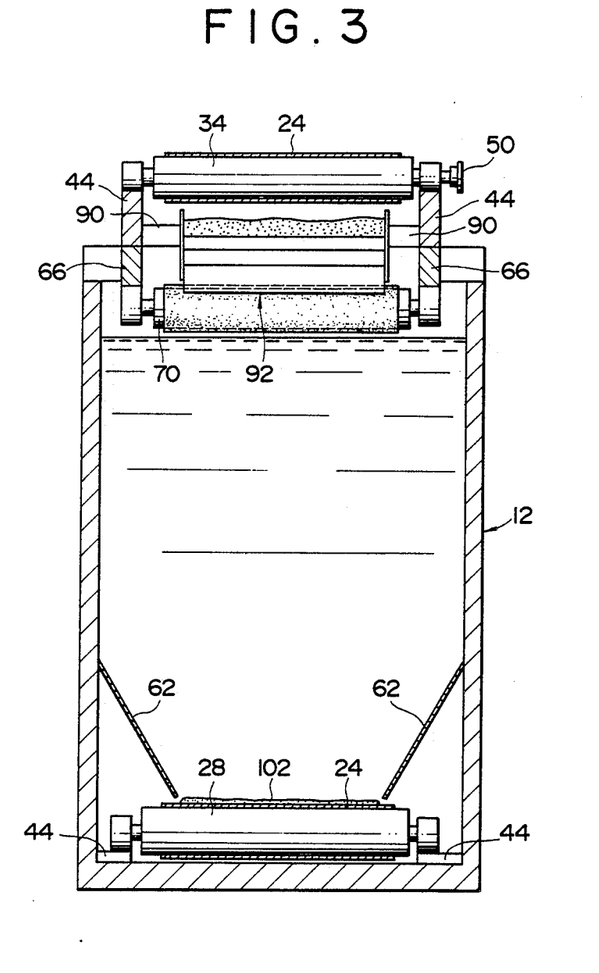
FIG. 3 is an enlarged-scale sectional view taken along a line 3—3 in FIG. 1.
Figure 4:
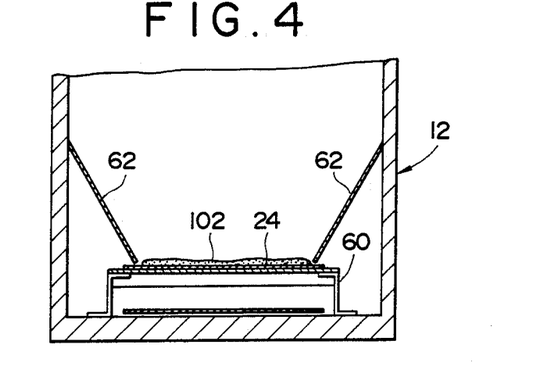
FIG. 4 is an enlarged-scale sectional view taken along a line 4-4 in FIG. 1.

Respective pulleys 28, 30, 32, 34, 36, 38, 40 and 42 are supported by a plurality of supports 44 fixed on the sedimentation tank 12, respectively. A drive mechanism 46 of the takeout mechanism 18 is supported by the support 44 for supporting the pulleys 32, 34 and 36. The rotation of the drive mechanism 46 is transmitted to the endless belt 24 through a sprocket 48 mounted on a rotary shaft of the drive mechanism, a sprocket 50 fixed on the pulley 34, around which the endless belt 24 is wound, and a chain 52 encircling both of the sprockets 48, 50.

Figure 5:
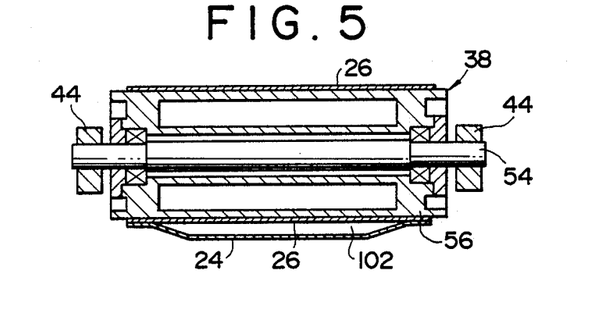
FIG. 5 is an enlarged-scale sectional view taken along a line 5-5 in FIG. 1.
Figure 6:
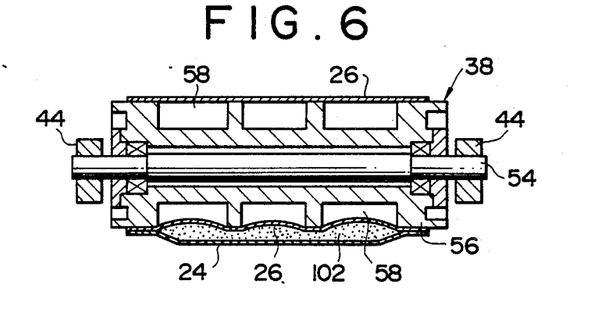
FIG. 6 is a sectional view similar in position to FIG. 5, but showing the case where another pulley is used.

The pulley 38 has a diameter larger than that of each of the other pulleys. Further, as shown in FIG. 5, the pulley 38 is provided with a shaft 54 supported by the supports 44 and a roller 56 rotatably supported by the shaft. In the illustrated embodiment, the roller 56 has a cylindrical outer peripheral surface. A plurality of annular grooves 58 may be formed on the outer peripheral portion of the roller 56, as shown in FIG. 6.

A guide 60 for preventing the endless belt 24 from being bent in the first conveyance section 22 and a pair of guides 62 for guiding the particulate matter contained in the muddy water so as to settle down the particulate matter on the first conveyance section 22 are disposed on the bottom of the sedimentation tank 12.

The processing apparatus 10 further comprises a conveyance mechanism 64 for conveying the particulate matter conveyed to the portion above the sedimentation tank 12 by the takeout mechanism 18 to the outside of the sedimentation tank 12. The conveyance mechanism 64 is provided with a pair of frames 66 provided above the sedimentation tank 12 to extend in the longitudinal direction of the sedimentation tank 12, a pair of pulleys 68, 70 supported at respective opposite ends of the frames, and an endless belt 72 disposed so as to circulate through both of the pulleys 68, 70 in order that the endless belt 72 receives the particulate matter conveyed from the takeout mechanism 18 to convey the received particulate matter.

The pair of frames 66 are disposed at an interval in the width direction of the sedimentation tank 12 and mounted on the sedimentation tank 12 by the use of a plurality of fittings 74. The conveyance mechanism 64 is disposed so that the pulley 68 is located at a position higher than the pulley 70. Accordingly, the particulate matter conveyance surface 76 of the endless belt 72 is slightly inclined to a horizontal line. The inclination for preventing the particulate matter on the endless belt 72 from flowing toward the pulley 70 together with water will suffice for the inclination of the conveyance surface 76 relative to the horizontal line. For example, the inclination may be defined within the range from 3° to 15°, preferably 5° to 10°.

The frames 66 support a plurality of guide rollers 78 for preventing the endless belt 72 from being bent. A drive mechanism 80 of the conveyance mechanism 64 is supported by the frame 66. The rotation of the drive mechanism 80 is transmitted to the endless belt 72 through a sprocket 82 mounted on a rotary shaft of the drive mechanism 80, a sprocket 84 connected with the pulley 68 and a chain 86 encircling both of the sprockets 82, 84 as shown in FIG. 2.

A pair of guide plates 88 are mounted on the respective frames 66 by the use of fittings 90 so as to extend along the both sides of the particulate matter conveyance surface 76 of the endless belt 72. As shown in FIG. 2, each of the guide plates 88 prevents the particulate matter from dropping out from the side of the endless belt 72 in the width direction.

Figure 7:
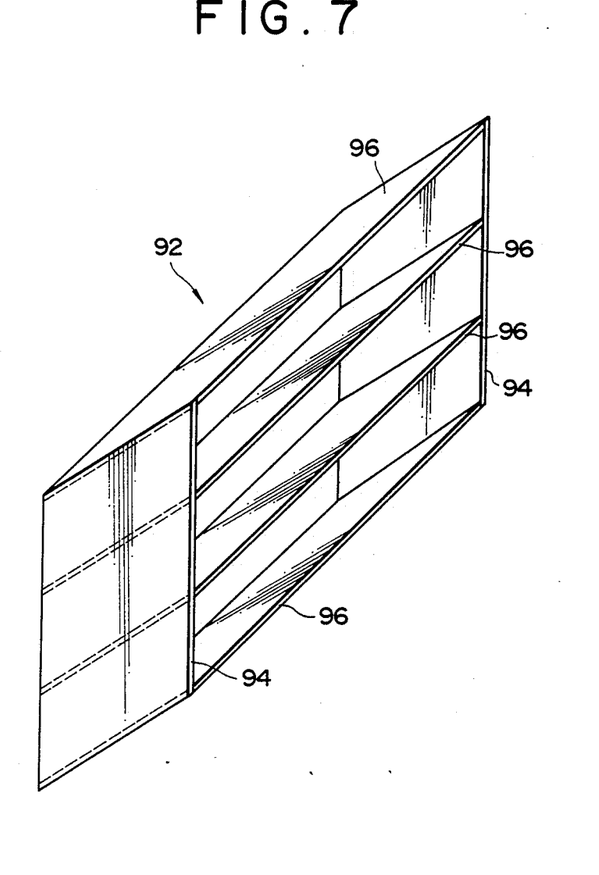
FIG. 7 is a perspective view showing an embodiment of a filter.

The conveyance mechanism 64 is further provided with a filter 92 preventing the passage of particulate matter received on the conveyance surface 76 of the endless belt 72 while permitting the passage of water. As shown in FIG. 7, the filter 92 takes the shape of a louver provided with a pair of plate members 94 confronting each other to extend in the vertical direction and a plurality of plate members 96 disposed between the plate members 94 at intervals in the vertical direction. Each of the plate members 96 is inclined so that one end of each plate member 96 in the width direction is located above the other end thereof. The filter 92 is fixed by the frames 66 such that one end of each plate member 96 as noted above is located on the rear side in the conveying direction of the particulate matter and the other end thereof is located on the front side.

The upper and lower edges of the filter 92 are respectively brought into contact with the endless belts 26 and 72. In consequence, the particulate matter to be conveyed by the endless belt 72 may be prevented from flowing down from the conveyance surface 76, while the particulate matter attached to the endless belt 26 may be scraped off to the conveyance mechanism 64.

Figure 8:
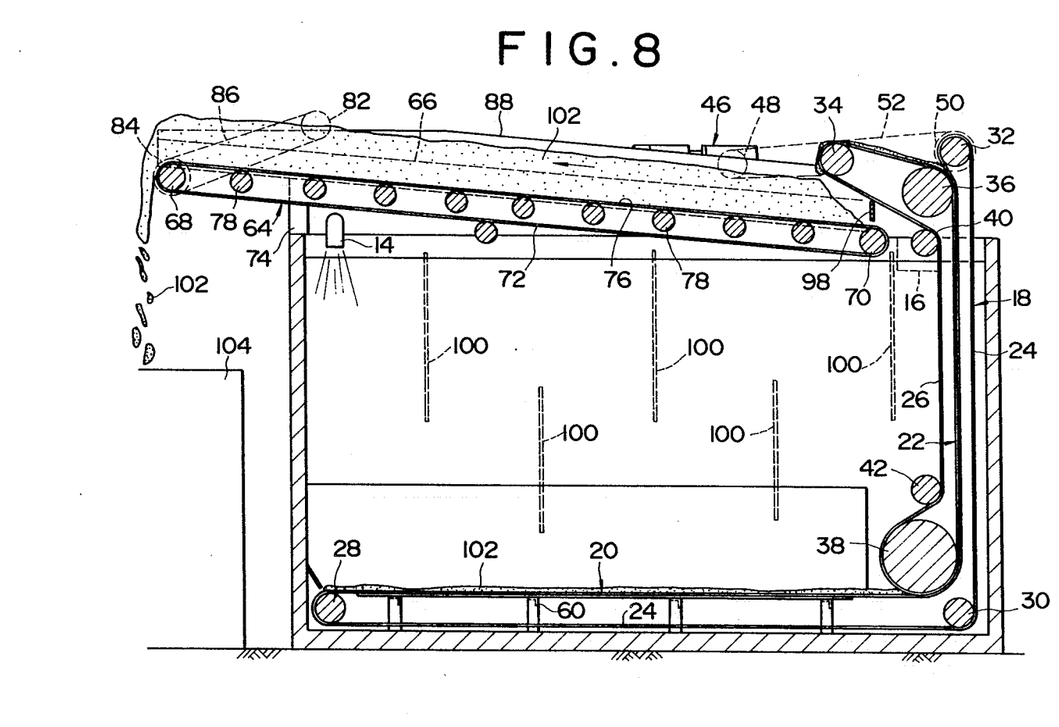
FIG. 8 is a longitudinal sectional view showing another embodiment of the processing apparatus.

In the embodiment shown in FIG. 1, the takeout mechanism 18 is so constructed that the particulate matter is dropped out on a starting end of a conveyance route of the conveyance mechanism 64. However, as shown in FIG. 8, an upper portion of the endless belt 26 of the takeout mechanism 18 may be extended above the conveyance mechanism 64 to drop out the particulate matter on the mid portion of the conveyance surface of the conveyance mechanism 64. In the case of the embodiment shown in FIG. 8, a plate member 98 for scraping off the particulate matter attached to the endless belt 26 onto the conveyance mechanism 64 may be provided instead of the filter 92.

In a muddy water processing apparatus as shown in FIG. 8, instead of the endless belt 24, the endless belt 26 is wound around the pulley 34. Further, the rotation of the drive mechanism 46 is transmitted to the endless belt 24 through the pulley 32.

Further, as shown by dotted lines in FIGS. 1 and 8, one or more partition plates 100 for preventing the muddy water supplied from the inlet port 14 into the sedimentation tank 12 from directly reaching the outlet port 16 may be provided in the sedimentation tank 12. By so doing, the muddy water supplied from the inlet port 14 into the sedimentation tank 12 moves downward from the upper portion of the tank and then moves upward from the lower portion thereof.

In use, the takeout mechanism 18 and the conveyance mechanism 64 are operated during the processing of muddy water. The particulate matter such as earth and sand contained in the muddy water is settled down on the first conveyance section 20 of the takeout mechanism 18 while the muddy water flows inside the sedimentation tank 12 from the side of the inlet port 14 toward the outlet port 16.

The particulate matter 102 settled down on the first conveyance section 20 is conveyed toward the pulley 38 through the first conveyance section 20 by the endless belt 24 and then conveyed upward through the second conveyance section 22 while being sandwiched between the endless belts 24, 26.

When the particulate matter 102 is sandwiched between the endless belts 24, 26 in the second conveyance section 22 as shown in FIG. 5, the muddy water survived in the particulate matter 102 is squeezed from the particulate matter. Accordingly, the particulate matter 102 conveyed through the second conveyance section 22 is low in water content. The use of the pulley 38 as shown in FIG. 6 is more effective in squeezing the muddy water from the interstices of the particulate matter, so that the particulate matter 102 conveyed through the second conveyance section 22 becomes lower in water content.

The precipitate conveyed above the sedimentation tank 12 by the takeout mechanism 18 is discharged from the takeout mechanism 18 to the conveyance mechanism 64, and thereafter discharged by the conveyance mechanism 64 to a receiver 104 such as a hopper disposed outside the sedimentation tank 12 and a transportation vehicle.

Water remaining in the particulate matter 102 conveyed to the conveyance mechanism 64 flows downward along the conveyance surface 76 of the conveyance mechanism 64, when conveyance is done by the conveyance mechanism 64, to thereby drop out into the sedimentation tank 12 through the filter 92. Accordingly, the particulate matter 102 conveyed to the receiver 104 such as a hopper becomes lower in water content.

Since the water drained out from the takeout mechanism 18 to the conveyance mechanism 64 is small in quantity, water flowing along the conveyance surface 76 is not so much in quantity as to make the particulate matter 102 on the conveyance surface 76 flow downward. Further, since each plate member 96 of the filter 92 is inclined reversely to the conveyance surface 76 of the conveyance mechanism 64, the particulate matter on the conveyance surface 76 is not caused by the water passing through the filter 92 to flow into the sedimentation tank 12 through the filter 92.

Namely, in order to drop out the particulate matter 102 on the conveyance surface 76 into the sedimentation tank 12 through the space between the adjacent plate members 96 of the filter 92, water is necessary in sufficient quantity as to fluidize the particulate matter 102 in the space between the adjacent plate members 96. However, since the water drained out from the takeout mechanism 18 to the conveyance mechanism 64 is small in quantity, the water dropping out into the sedimentation tank 12 through the filter 92 is also small in quantity, so that the particulate matter on the conveyance surface 76 is not able to flow into the sedimentation tank 12 through the filter 92.

The conveyance speed of the conveyance mechanism 64 is preferably set to a value slower than the speed of the takeout mechanism 18, particularly to a value within the range from one half to one tenth of the speed of the takeout mechanism. By so doing, the particulate matter 102 may remain on the conveyance surface 76 for a long time and a large quantity of water flows toward the filter 92 along the conveyance surface 76 during a period of time when the particulate matter remains on the conveyance surface, so that it is largely effective in draining off water in the conveyance mechanism 64 and the particulate matter 102 received in the receiver 104 becomes lower in water content.

What is claimed is:

1. A muddy water processing apparatus for processing muddy water containing particulate matter, comprising:
   a tank having an inlet port and an outlet port for said muddy water;
   takeout means including a belt conveyor provided with: a first conveyance section disposed at the bottom of said tank for receiving said particulate matter settling down in said tank and then conveying the received particulate matter to a predetermined position in said tank; and a second conveyance section for conveying upward the particulate matter conveyed from said first conveyor to the upper portion of said tank while sandwiching said particulate matter between a pair of endless belts; and
   a flow path defining means disposed in said tank having means for defining a flow passage such that said muddy water supplied from said inlet port into said tank moves downward from the upper portion of said tank and then upward from the lower portion thereof.

2. A muddy water processing apparatus according to claim 1, wherein said belt conveyor includes a first endless belt having: a first portion extending from one end to the other end of said tank along the bottom thereof so as to define said first conveyance section; and a second portion extending upward from said bottom at said other end, and a second endless belt having a portion extending upward from said bottom at said other end so as to define said second conveyance section in cooperation with said second portion of said first endless belt.

3. A muddy water processing apparatus according to claim 2, wherein said first endless belt is disposed so as to circulate through a first pulley disposed at one end of said bottom so as to extend along the bottom of said tank, a second pulley disposed at the other end of said bottom so as to extend in cooperation with said first extend in cooperation with said second pulley, and a fourth pulley disposed so as to extend in cooperation with said second pulley in a position slightly above said second pulley, and said second endless belt is disposed so as to circulate through said fourth pulley and a fifth pulley disposed above said tank so as to extend in cooperation with said third pulley.

4. A muddy water processing apparatus according to claim 1, further comprising conveying means provided with a belt conveyor for receiving the particulate matter conveyed to the upper portion of said tank by said takeout means and then for conveying the received particulate matter to the outside of said tank, said belt conveyor having a conveyance surface extending obliquely upward.

5. A muddy water processing apparatus according to claim 4, further comprising a filter disposed so as to rise from a lower end of said conveyance surface, said filter preventing the passage of said particulate matter received on said conveyance surface but permitting the passage of water.

6. A muddy water processing apparatus according to claim 5, wherein said filter includes a pair of first plate members confronting each other to extend in the vertical direction and a plurality of second plate members disposed between said first plate members at intervals in the vertical direction and inclined so that one end of each second plate member in the width direction is located above the other end thereof, and said filter is disposed so that said one end of each second plate member is located toward the rear side in the conveying direction of said particulate matter and said other end is located toward the front side.

7. A muddy water processing apparatus according to claim 1, further comprising a pair of guides disposed in said tank so as to guide the particulate matter settling down in said tank to said first conveyance section. said particulate matter between a pair of endless belts; and
   a flow path defining means disposed in said tank having means for defining a flow passage such that said muddy water supplied from said inlet port into said tank moves downward from the upper portion of said tank and then upward from the lower portion thereof.

8. A muddy water processing apparatus according to claim 1, wherein said inlet port is formed at one end of said tank, while said outlet port is formed at the other end of said tank.

9. A muddy water processing apparatus for processing muddy water containing particulate matter, comprising:
   a tank having an inlet port and an outlet port for said muddy water;
   takeout means including a belt conveyor provided with: a first conveyance section disposed at the bottom of said tank for receiving said particulate matter settling down in said tank and then conveying the received particulate matter to a predetermined position in said tank; and a second conveyance section for conveying upward the particulate matter conveyed from said first conveyor to the upper portion of said tank while sandwiching the particulate matter between a pair of endless belts; and
   conveying means provided with a belt conveyor for receiving the particulate matter conveyed to the upper portion of said tank by said takeout means and then for conveying the received particulate matter to the outside of said tank, said belt conveyor having a conveyance surface extending obliquely upward and being disposed such that said conveyance surface extends onto the top portion of the tank.

* * * * *

UNITED STATES PATENT AND TRADEMARK OFFICE
CERTIFICATE OF CORRECTION

PATENT NO. : 4,971,693
DATED : November 20, 1990
INVENTOR(S) : Toshio Akesaka

It is certified that error appears in the above-identified patent and that said Letters Patent is hereby corrected as shown below:

On the title page item [75] Inventor: "Troshio Akesaka" should read --Toshio Akesaka--.

Col. 1, line 43, change "tank," to --tank--.

Col. 1, line 64, change "solidliquid" to --solid-liquid--.

Col. 1, line 66, after "invention" delete ", use".

Col. 2, line 15, change "second pulley" to --second pulley,--.

Col. 2, line 31, change "as noted above" to --, as noted above,--.

Col. 2, line 45, change "filter," to --filter--.

Col. 4, line 3, change "are overlapped" to --overlap--.

Col. 4, line 67, change "pulley 68" to --pulley 68,--.

Col. 6, line 59, change "one half" to --one-half--.

Col. 6, line 59, change "one tenth" to --one-tenth--.

Claim 3, col. 7, line 40, after "first" insert --pulley, a third pulley disposed above said tank so as to--.

UNITED STATES PATENT AND TRADEMARK OFFICE
CERTIFICATE OF CORRECTION

PATENT NO. : 4,971,693

DATED : November 20, 1990

INVENTOR(S) : Toshio Akesaka

It is certified that error appears in the above-identified patent and that said Letters Patent is hereby corrected as shown below:

Claim 7, col. 8, lines 20-28, after "section" delete --remaining text of claim 7--.

Signed and Sealed this

Twenty-first Day of April, 1992

Attest:

HARRY F. MANBECK, JR.

*Attesting Officer*     Commissioner of Patents and Trademarks